United States Patent [19]

Kassai

[11] Patent Number: 4,634,185
[45] Date of Patent: Jan. 6, 1987

[54] CHILDREN'S AUTOMOBILE-MOUNTED SAFETY SEAT

[75] Inventor: Kenzou Kassai, Osaka, Japan

[73] Assignee: Aprica Kassai Kabushikikaisha, Osaka, Japan

[21] Appl. No.: 739,871

[22] Filed: May 31, 1985

[30] Foreign Application Priority Data

Jun. 11, 1984 [JP] Japan .......................... 59-87138[U]
Nov. 9, 1984 [JP] Japan .......................... 59-170740[U]

[51] Int. Cl.4 ........................... A47C 1/08; B60N 1/12
[52] U.S. Cl. .................................. 297/487; 297/148; 297/216; 297/250; 464/39
[58] Field of Search .............. 297/135, 140, 148, 149, 297/153, 173, 216, 250, 373, 377, 487, 488; 192/28, 30, 135, DIG. 57; 464/39

[56] References Cited

U.S. PATENT DOCUMENTS

| 197,115 | 11/1877 | Frees | 292/28 |
| 2,240,400 | 4/1941 | Johnson | 292/DIG. 57 X |
| 2,498,558 | 2/1950 | Lantz | 403/116 X |
| 3,068,667 | 12/1962 | Sussman | 464/39 X |
| 3,336,075 | 8/1967 | Wilson | 292/28 X |
| 3,409,326 | 11/1968 | Kerner | 297/488 X |
| 3,811,701 | 5/1974 | Grime | 297/488 X |
| 3,837,670 | 9/1974 | Hilyard | 297/488 X |
| 3,888,329 | 6/1975 | Monaghan | 297/488 X |
| 4,272,973 | 6/1981 | Fu-Tsai | 464/39 X |
| 4,436,341 | 3/1984 | Converse | 297/250 |

FOREIGN PATENT DOCUMENTS 2330935 1/1974 Fed. Rep. of Germany ...... 297/488

Primary Examiner—James T. McCall
Assistant Examiner—Peter R. Brown
Attorney, Agent, or Firm—W. G. Fasse; D. H. Kane, Jr.

[57] ABSTRACT

A children's automobile-mounted safety seat (1) has a seat portion (2), a safety guard (6), left-hand and right-hand support rods (b 9, 10), and left-hand and right-hand connecting rods (15, 16) built onto the safety guard (6) and removably attached to the left-hand and right-hand rear portions (18, 19) of the seat portion (2). The left-hand and right-hand support rods (9, 10) are journalled at their upper ends to the left-hand and right-hand lateral surfaces of the safety guard (6) and at their lower ends to the left-hand and right-hand lateral surfaces (11, 12) of the bottom of the seat portion (2). The left-hand and right-hand connecting members (15, 16) are built into the safety guard (6) so that they are longitudinally slidable within a predetermined range. The children's automobile-mounted safety seat (1) further has left-hand and right-hand springs to urge the left-hand and right-hand connecting members (15, 16) of the safety guard (6) to move toward each other.

15 Claims, 37 Drawing Figures

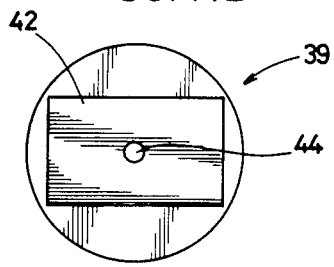
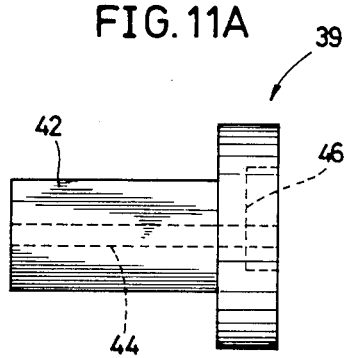
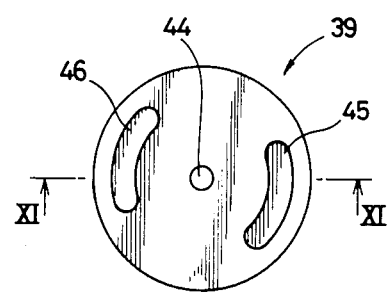
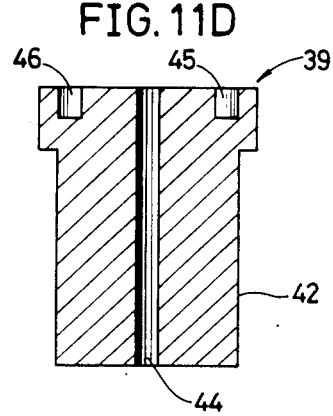

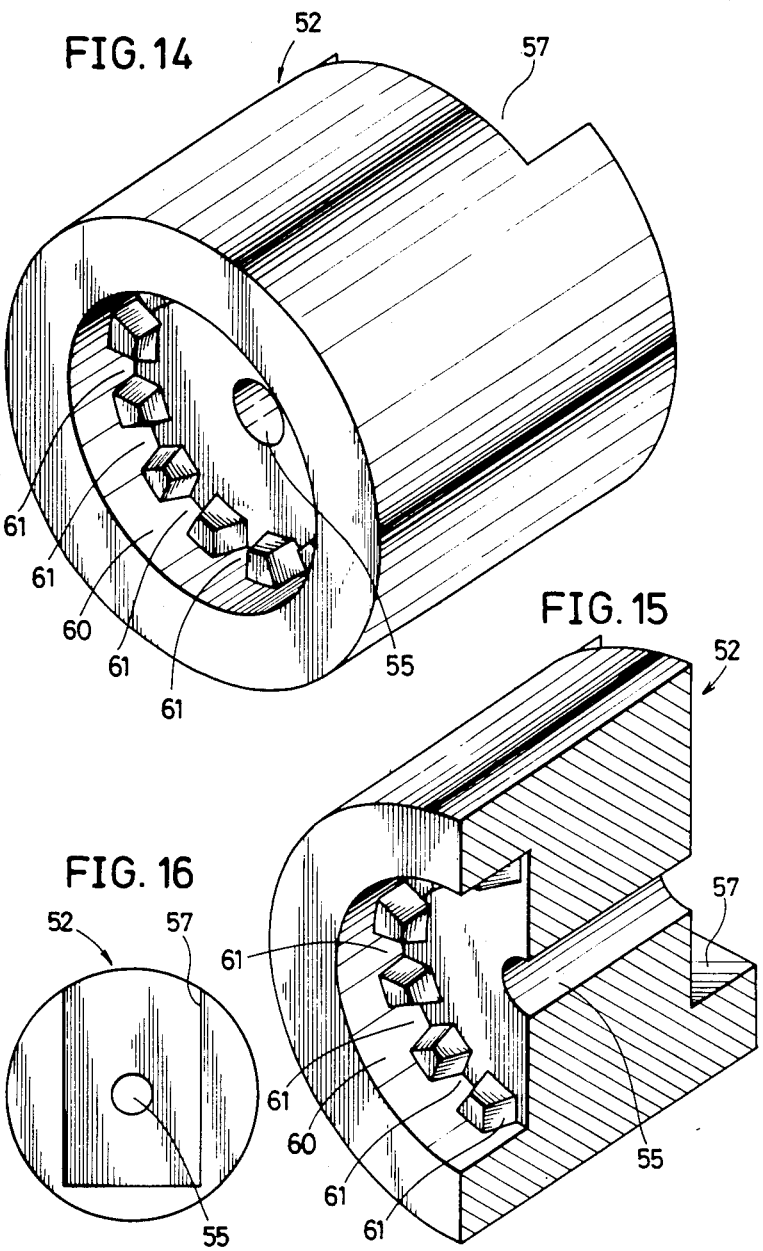

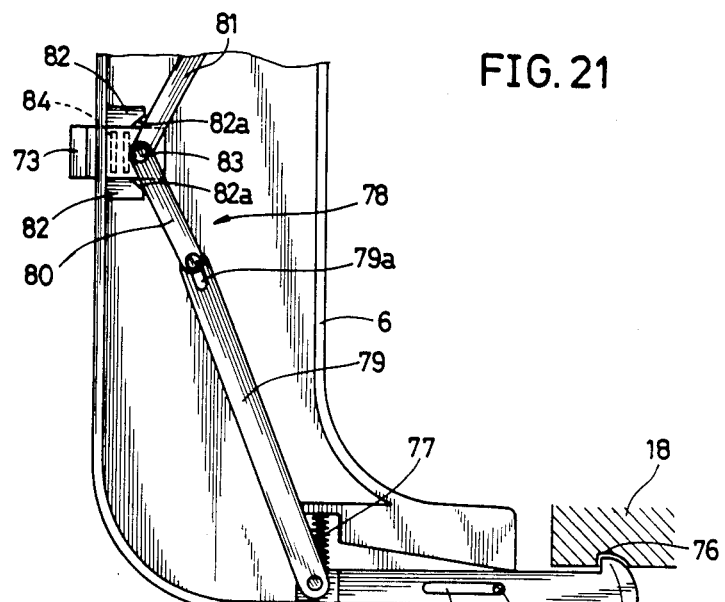
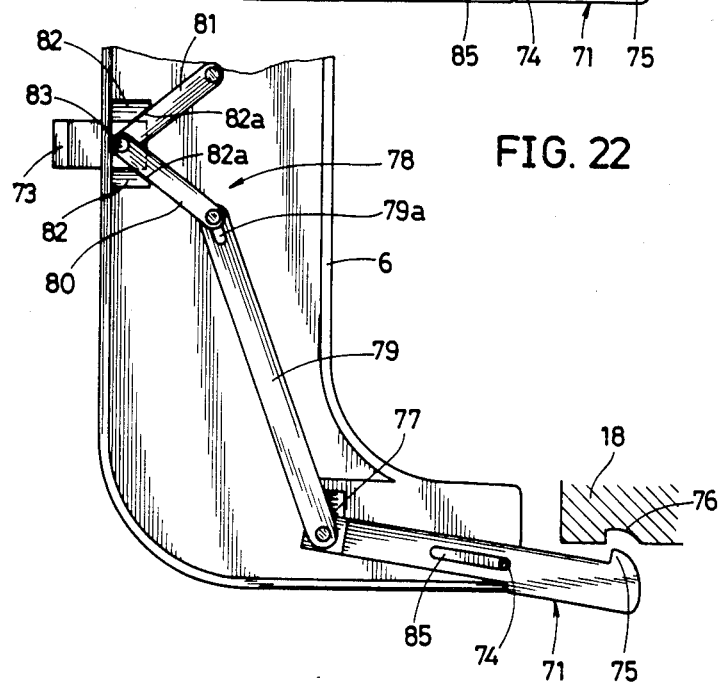

CHILDREN'S AUTOMOBILE-MOUNTED SAFETY SEAT

BACKGROUND OF THE INVENTION

1. Field of the Invention

This invention relates to a children's automobile-mounted safety seat which ensures that a baby or child placed in an automobile is held in a predetermined position all the time during the running of the automobile, thereby guaranteeing the intended safety, and more particularly it relates to a children's automobile-mounted safety seat provided with a safety guard disposed forwardly of the seat portion to prevent the baby or child from being thrown forwardly out of the seat portion.

2. Description of the Prior Art

This type of children's automobile-mounted safety seat is firmly fastened onto the car seat by utilizing, for example, the built-in belt of the automobile. Thus, even when the automobile is suddenly braked or is running along a sharp curve or encounters a collision accident, the baby or child is firmly held in position by the safety belt and safety guard of the present safety seat which will remain in the predetermined position, a fact which is desirable from the standpoint of safety.

If, however, the automobile encounters a collision accident, the impact which the baby or child receives from the safety guard and safety belt will be enormous. Thus, it is desirable to alleviate such impact.

SUMMARY OF THE INVENTION

Accordingly, an object of this invention is to provide a children's automobile-mounted safety seat constructed to relieve an impact which would otherwise be imposed on the baby or child when the automobile encounters a collision accident.

This invention is a children's automobile-mounted safety seat comprising a seat portion for a baby or child to sit in, a safety guard disposed forwardly of the seat portion, left-hand and right-hand support rods for connecting the left-hand and right-hand lateral surfaces of the safety guard to the left-hand and right-hand lateral surfaces of the bottom of the seat portion, and left-hand and right-hand connecting members built in the safety guard and removably attached to the left-hand and right-hand rear portions of the seat. The left-hand and right-hand support rods are turnably connected to their upper ends to the left-hand and right-hand lateral surfaces of the safety guard and at their lower ends to the left-hand and right-hand lateral surfaces of the bottom of the seat portion. The left-hand and right-hand connecting members are built in the safety guard in such a manner that they are slidable back and forth within a predetermined range. The present children's automobile-mounted safety seat further comprises left-hand and right-hand springs urging the left-hand and right-hand connecting members and the safety guard to slide toward each other.

According to this invention, since the safety guard is constructed for back and forth sliding movement and is constantly urged to slide rearwardly by the action of the left-hand and right-hand springs, it is possible to relieve an impact which the baby or child receives when the automobile encounters a collision accident.

Stated in more detail, if the automobile encounters a collision accident, the baby or child tends to be thrown forwardly out of the seat portion of the children's automobile-mounted safety seat under the influence of inertia. However, the forward throwing is prevented by the safety belt and safety guard. More particularly, the baby's or child's body is firmly held by the safety belt so that it will not separate from the seat, but it still moves forwardly in the seat portion under the influence of inertia. This forward movement continues until the baby's or child's body bumps against the safety guard. If the safety guard is fixed to the seat so that it cannot move at all, the impact which the baby's or child's body receives will be enormous. According to this invention, however, the baby's or child's body is allowed to move further forwardly together with the safety guard even after it has bumped against the safety guard and a portion of the impact which results from bumping can be absorbed by the left-hand and right-hand springs, so that the impact to the baby or child is relieved.

Further, since the left-hand and right-hand connecting members are removably attached to the seat and since the left-hand and right-hand support rods are turnably connected to the bottom of the seat portion, the safety guard can be moved to a front lower position. Thus, the presence of the safety guard does not interfere when the baby or child is placed in or taken out of the seat.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 11A is a front view of a holder shown in FIG. 10;

FIG. 11B is a left-hand side view of the holder;

FIG. 11C is a right-hand side view of the holder;

FIG. 11D is a sectional view taken along the line XI—XI in FIG. 11C;

FIG. 14 is a perspective view of a lower end fixing bracket shown in FIG. 10;

FIG. 15 is a view taken by centrally cutting the lower end fixing bracket shown in FIG. 14;

FIG. 16 is a left-hand side view of the lower end fixing bracket shown in FIG. 14;

FIG. 21 is a plan view showing the left-hand portion of a safety guard shown in FIG. 20, the upper portion of the safety guard being removed;

FIG. 22 is a view showing a state after an operating button has been forwardly pulled from the state of FIG. 21;

DESCRIPTION OF PREFERRED EMBODIMENTS AND OF THE BEST MODE OF THE INVENTION

First, an outline of an embodiment of this invention will be given with reference to FIGS. 1 to 4, and then the components will be described in detail.

Figure 1:
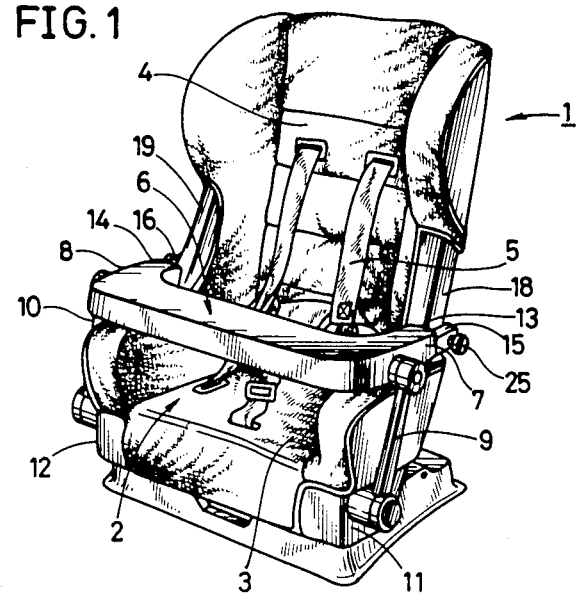
FIG. 1 is a perspective view showing an embodiment of this invention.

A children's automobile-mounted safety seat 1 shown in FIG. 1 will be firmly fixed to a car seat by utilizing, for example, the belt forming part of the automobile seat. The seat portion 2 of the children's automobile-mounted safety seat 1 comprises a seat area 3, and a backrest 4. Safety belts 5 are provided to firmly hold the body of a baby or child sitting on in the seat portion. As shown, a safety guard 6 is positioned forwardly of the seat portion 2. This safety guard 6 is shown in plan view in FIG. 3 and in side view in FIG. 4.

Figure 2:
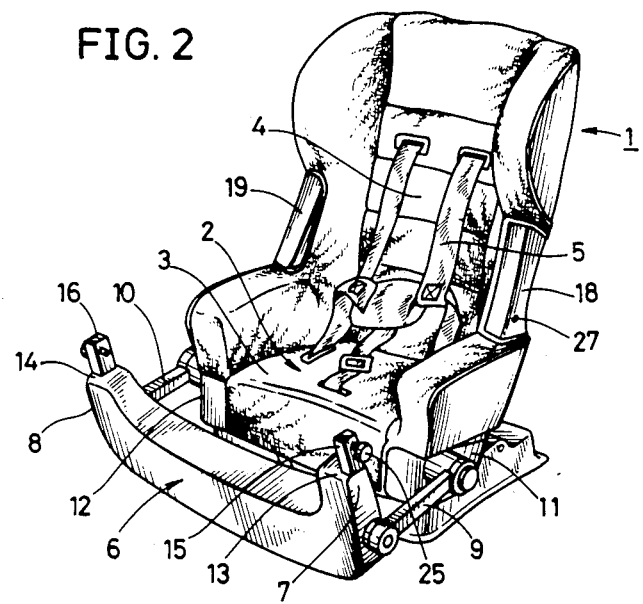
FIG. 2 is a perspective view showing a state after a safety guard has been moved from the state of FIG. 1 to a lower down position.
Figure 3:
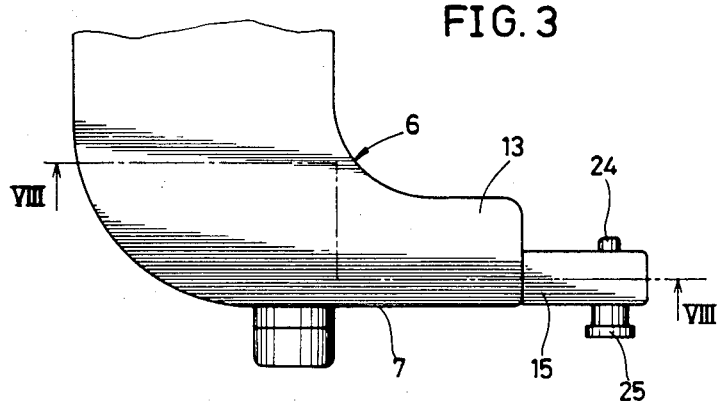
FIG. 3 is a plan view showing the left-hand portion of the safety guard shown in FIG. 1.
Figure 4:
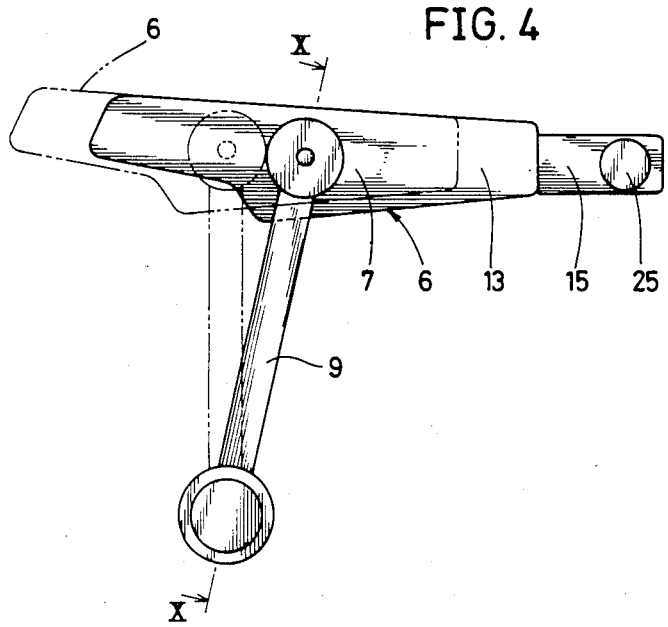
FIG. 4 is a view of an arrangement associated with the safety guard shown in FIG. 1, the view being taken from the left-hand side.

Referring to FIGS. 1, 3 and 4, the manner in which the safety guard 6 is attached to the seat portion 2 of the safety seat 1 will now be described. Left-hand and right-hand support rods 9 and 10 are turnably connected at their upper ends to the left-hand and right-hand lateral surfaces 7 and 8 of the safety guard 6. The lower ends of the left-hand and right-hand support rods 9 and 10 are turnably connected to the left-hand and right-hand lateral surfaces 11 and 12 of the bottom of the seat portion 2, respectively, Further, the left-hand and right-hand rear portions 13 and 14 of the safety guard 6 have respectively installed therein left-hand and right-hand connecting members 15 and 16. The left-hand and right-hand connecting members 15 and 16 are slidable back and forth with respect to the safety guard 6. Though not appearing in FIGS. 1 to 4, there are provided a left-hand spring 17 (FIG. 8) and a right-hand spring which urge the left-hand and right-hand connecting members 15 and 16 and the safety guard 6 to move toward each other or, in other words, urge the safety guard 6 to slide rearwardly. Thus, the safety guard 6 normally assumes the solid-line position shown in FIG. 4, but if the baby's or child's body bumps against the safety guard 6 due to a collision accident, the safety guard 6 will be moved together with the baby's or child's body to the phantom-line position shown in FIG. 4 against the forces of the left-hand and right-hand springs. In this manner, the impact of the baby or child is damped.

The left-hand and right-hand connecting members 15 and 16 are removably attached to the left-hand and right-hand rear portions 18 and 19 of the seat 1. The state shown in FIG. 2 is obtained by pulling the left-hand and right-hand connecting members 15 and 16 out of the rear portions 18, 19 and then forwardly tilting the safety guard 6. If the safety guard 6 is positioned forwardly and downwardly of the seat portion 2, as shown in FIG. 2, the presence of the safety guard 6 will not interfere when a baby or child is placed in or taken out of the seat 1.

The components will now be described in more detail. In addition, as is clear from FIGS. 1 and 2, the principal portion of this invention is provided in connection with the left-hand and right-hand lateral surfaces 7 and 8 of the safety guard 6. Since the arrangement provided in connection with the left-hand lateral surface 7 is substantially the same as the arrangement provided in connection with the right-hand lateral surface 8, only the arrangement associated with the left-hand lateral surface 7 will be described.

Figure 5:
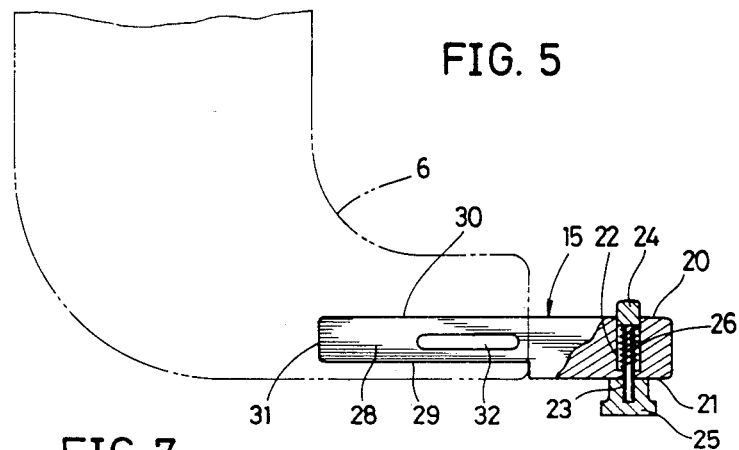
FIG. 5 is a plan view of the left-hand connecting member shown in FIG. 1, the view being shown partly in section.

FIG. 5 is a plan view of the left-hand connecting member 15. In this view, part of the left-hand connecting member 15 is shown in section and the safety guard 6 in phantom lines. The rear portion of the left-hand connecting member 15 has an opening 22 extending from the right-hand lateral surface 20 almost to the left-hand lateral surface 21 thereof. An axially slidable locking pin 23 is received in the opening 22. One end of the locking pin 23 is provided with a head 24 which projects beyond the right-hand lateral surface 20 of the left-hand connecting member 15. The other end of the locking pin 23 projects beyond the left-hand lateral surface 21 of the left-hand connecting member 14, with the projecting portion having a knob 25 fixed thereon. A spring 26 is interposed between the head 24 of the locking pin 23 and the bottom of the opening 22, thereby constantly urging the locking pin 23 to slide to the right, that is, toward the left-hand lateral rear portion 18. The head 24 of the locking pin 23 fits in a locking hole 27 (see FIG. 2) formed in the left-hand rear portion 18 of the seat 1, whereby the left-hand connecting member 15 is attached to the rear portion 18. When it is desired to disconnect the left-hand connecting member 15 from the rear portion 18, this can be attained by pulling the knob 25 against the force of the spring 26 so as to cancel the engagement between the head 24 and the locking hole 27 in the rear portion.

The arrangement for removably attaching the left-hand connecting member 15 to the left-hand rear portion 18 of the seat 1 is not limited to the one shown in FIG. 5. For example, the locking pin 23 shown in FIG. 5 may be replaced by a screw adapted for threaded engagement with a threaded hole which may be formed in the left-hand rear portion 18 of the seat 1. In this case, the left-hand connecting member 15 will be attached or detached by rotating the screw. Thus, when compared with the construction using a screw, the construction shown in FIG. 5 is advantageous in that the operation for attachment and detachment of the left-hand connection member 15 is easier.

Figures 6, 7:
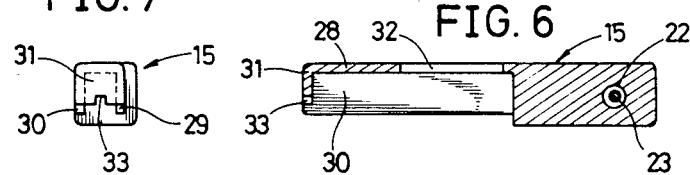
FIG. 6 is a side elevational view of the left-hand connecting member.
FIG. 7 is a front view of the left-hand connecting member.

Referring to FIGS. 5 to 7, the front portion of the left-hand connecting member 15 comprises a top wall 28, a left-hand wall 29, a right-hand wall 30 and a front wall 31. The top wall 28 has a longitudinally extending elongated hole 32. Further, the lower end of the front wall 31 has a guide hole 33.

Figure 8:
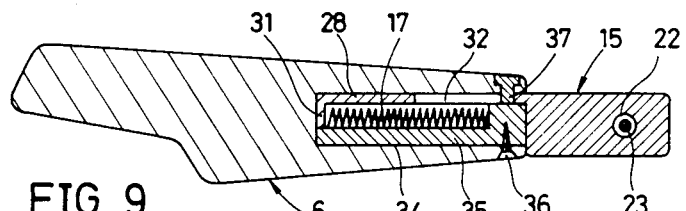
FIG. 8 is a sectional view taken along the line VIII—VIII in FIG. 3.

As is clear from FIG. 8 showing a sectional view taken along the line VIII—VIII in FIG. 3, the safety guard 6 has a longitudinally extending reception opening 34 for slidably receiving the left-hand connecting member 15. An L-shaped member 35 is fixed in the reception opening 34 by a screw 36. The rear end of the L-shaped member 35 projects upwardly, and a left-hand spring 17 is interposed between the projecting portion and the front wall 31 of the left-hand connecting member 15. Thus, the left-hand connecting member 15 and the safety guard 6 are slidable relative to each other within the same range as the pin 37 is movable in the elongated hole 32. The left-hand spring 17 urges the safety guard 6 and the left-hand connecting member 15 to slide toward each other or, in other words, urges the safety guard 6 to slide rearwardly. The state shown in FIG. 8 is one in which the pin 37 abuts against the rear end of the elongated hole 32, that is, a state in which the safety guard 6 is in the rearmost position. If the baby's or child's body bumps against the safety guard 6 due to, for example, a collision accident, the safety guard 6 is caused to slide forwardly against the force of the left-hand spring 17, thus damping the impact on the baby or child.

Figure 9:
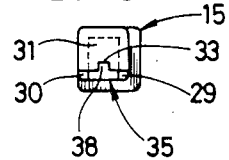
FIG. 9 is a front view showing the manner in which the left-hand connecting member and an L-shaped member shown in FIG. 8 are put together.

FIG. 9 shows the manner in which the left-hand connecting member 15 and the L-shaped member 35 shown in FIG. 8 are put together. The L-shaped member 35 is shaped to have an upward projection 38 adapted to fit in the guide hole 33 formed in the front wall 31 of the left-hand connecting member 35, whereby, the safety guard 6 is inhibited from swaying transversely when it slides longitudinally.

Figure 10:
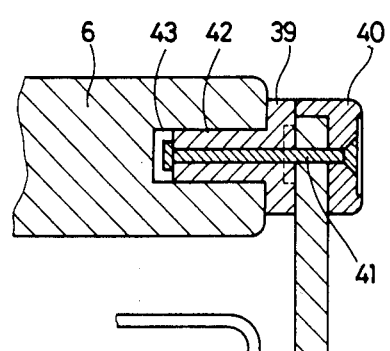
FIG. 10 is a sectional view taked along the line X—X in FIG. 4.

FIG. 10 is a sectional view taken along the line X—X in FIG. 4. The safety guard 6 has a holder 39 fixed thereto, while the upper end of the left-hand connecting member 9 has an upper end fixing bracket 40 fixed thereto. The holder 39 and the upper end fixing bracket 40 are interconnected by a connecting pin 41 permitting a relative rotation between the member 9 and the guard 6. This arrangement will now be described with reference to FIGS. 11 to 13 as well as FIG. 10.

FIGS. 11A to 11D show in detail the shape of the holder 39 shown in FIG. 10. The holder 39 has a leg 42 of quadrangular cross-section. The safety guard 6 has a hole 43 shaped to receive the leg 42. Thus, the holder 39 is fixed to the safety guard 6 with its leg 42 fitted in the hole 43. The holder 39 has a round, central throughgoing hole 44 through which the connecting pin 41 shown in FIG. 10 extends. As shown in FIG. 11C, the holder 39 has two arcuate elongated holes 45 and 46 extending along arcs concentric with the throughgoing hole 44.

Figure 12A:
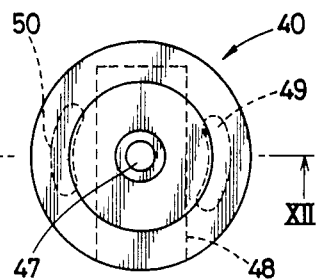
FIG. 12A is a right-hand side view of an upper end fixing bracket shown in FIG. 10.
Figure 12B:
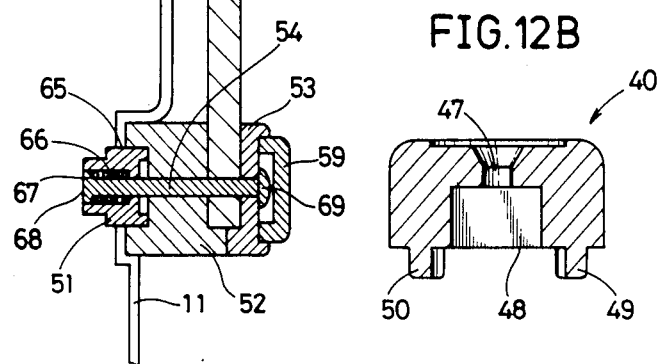
FIG. 12B is a front sectional view taken along the line XII—XII in FIG. 12A.
Figure 12C:
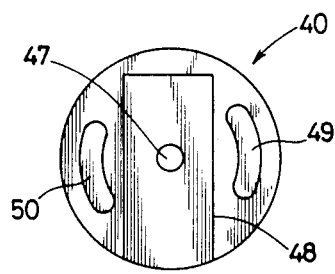
FIG. 12C is a left-hand side view of the upper end fixing bracket.

FIG. 12 shows in detail the upper end fixing bracket 40 shown in FIG. 10 and having a central throughgoing hole 47 through which the connecting pin 41 shown in FIG. 10 extends. The upper end fixing bracket 40 has a reception recess 48 of quadrangular cross-section. The upper end of the left-hand support rod 9 also has a quadrangular cross-section fitting into the recess 48. Further, the upper end fixing bracket 40 is provided with projections 49 and 50 adapted to be positioned in the arcuate elongated holes 45 and 46 of the holder 39. In this embodiment, the projections 49 and 50 are arcuate and elongated, extending along arcs concentric to the throughgoing hole 47. The length of the arcs of the projections 49 and 50 is less than the length of the arcuate elongated holes 45 and 46 of the holder 39.

Figure 13B:
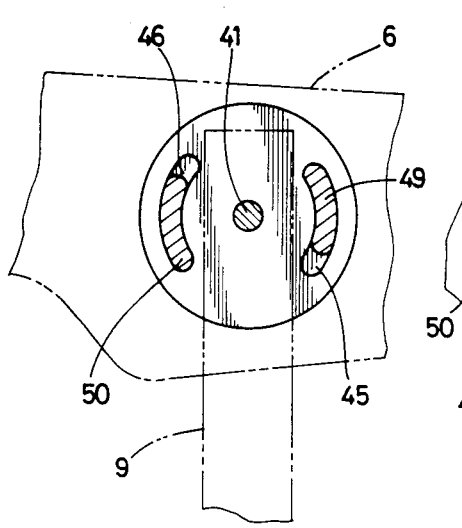
FIG. 13B shows a state after the left-hand support rod has been turned counterclockwise from the state of FIG. 13A.
Figure 13A:
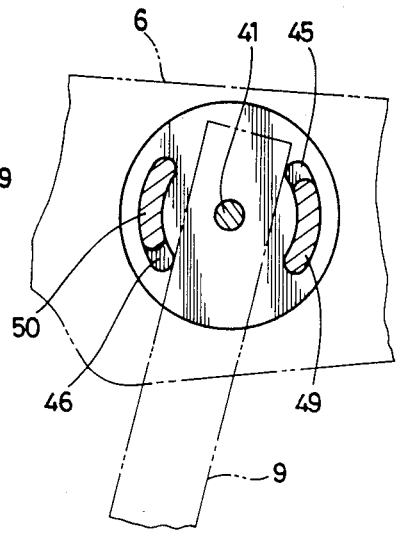
FIG. 13A is a view showing a state where projections on the upper end fixing bracket are positioned in arcuate elongated holes in the holder.

The positional relation between the arcuate elongated holes 45 and 46 of the holder 39 and the projections 49 and 50 on the upper end fixing bracket 40 is clear from FIGS. 13A and 13B. In FIGS. 13A and 13B the projections 49 and 50 on the upper end fixing bracket 40 are shown in cross-section, while the safety guard 6 and the left-hand support rod 9 are shown in phantom lines. As shown, the left-hand support rod 9 is turnable relative to the safety guard 6 within the same range as the projections 49 and 50 are movable in the arcuate elongated holes 45 and 46. The state shown in FIG. 13A is a normal working state, and the state shown in FIG. 13B is one in which the safety guard 6 has forwardly slid. Since the range which allows the turning of the left-hand support rod 9 is restricted in the manner described above, the following advantages will be obtained.

The first advantage is that the load on the elongated hole 32 and pin 37 shown in FIG. 8 can be relieved. That is, the end of the forward sliding movement of the safety guard 6 is defined by the pin 37 abutting against the front end of the elongated hole 32. If the left-hand support rod 9 and the safety guard 6 were freely turnable, the load which inhibits the forward sliding movement of the safety guard 6 would concentrate on the front end of the elongated hole 32 and on the pin 37. If the range within which the pin 37 is movable in the elongated hole 32 is made to coincide with the range within which the projections 49 and 50 on the upper end fixing bracket 40 are movable in the arcuate elongated holes 45 and 46, then the load which inhibits the forward sliding movement of the safety guard 6 will be distributed to two locations.

A second advantage is exhibited when the safety guard 6 is moved to a forward lower position shown in FIG. 2. That is, when the seat 1 is brought to the state shown in FIG. 2 during the running of the automobile, if the safety guard 6 would be freely turnable, the safety guard 6 will also swing in response to the sway of the automobile. This is undesirable from the standpoint of safety and can damage the automobile seat. Such disadvantage has been eliminated by restricting the range of the turning movement of the safety guard 6, whereby moving the safety guard 6 from the state shown in FIG. 2 to the state shown in FIG. 1 and attaching the left-hand and right-hand connecting members 15 and 16 to the seat portions 18, 19 are additionally facilitated.

Referring again to FIG. 10, the left-hand lateral surface 11 of the bottom of the seat portion is provided with a brake member 51 which is slidable back and forth. A lower end fixing bracket 52 and an attaching bracket 53 are secured to the lower end of the left-hand support rod 9. The brake member 51 and the lower end fixing bracket 52 and attaching bracket 53 fixed to the left-hand support rod 9 are interconnected for rotation relative to each other by a connecting pin 54. The arrangement of the brake mechanism will now be described with reference to FIGS. 14 to 19 as well as FIG. 10.

Figure 17A:
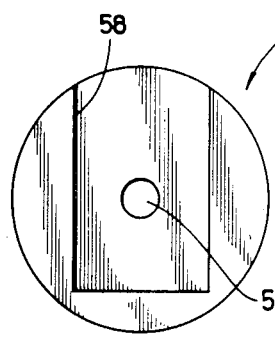
FIG. 17A is a side view of an attaching bracket shown in FIG. 17A.
Figure 17B:
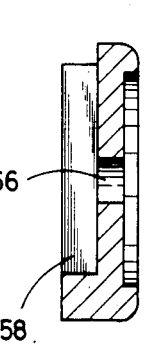
FIG. 17B is a front sectional view of the attaching bracket.
Figure 17C:
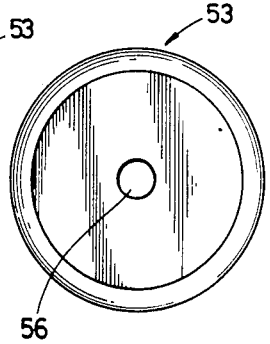
FIG. 17C is a right-hand side view of the attaching bracket.

FIGS. 14 to 16 show the lower end fixing bracket 52 and FIG. 17 shows the attaching bracket 53. The lower end fixing bracket 52 and the attaching bracket 53 have throughgoing holes 55 and 56, respectively, in their respective centers. The connecting pin 54 shown in FIG. 10 extends through these throughgoing holes 55 and 56. The opposed surfaces of the lower end fixing bracket 52 and attaching bracket 53 have reception recesses 57 and 58 of quadrangular cross-section, respectively. The lower end of the left-hand support rod 9 which is quadrangular in cross-section fits into the reception recesses 57 and 58. In addition, a cover 59 is attached to the lateral surface of the attaching bracket 53.

As is clear from FIGS. 14 and 15, the lateral surface of the lower end fixing bracket 52 opposed to the brake member 51, has a circular recess 60. The bottom of the circular recess 60 has a plurality of engagement recesses 61 arranged in a circle the center of which is located at the throughgoing hole 55. Each engagement recess 61 is tapered so that its width is gradually narrowed toward the bottom.

Figure 18:
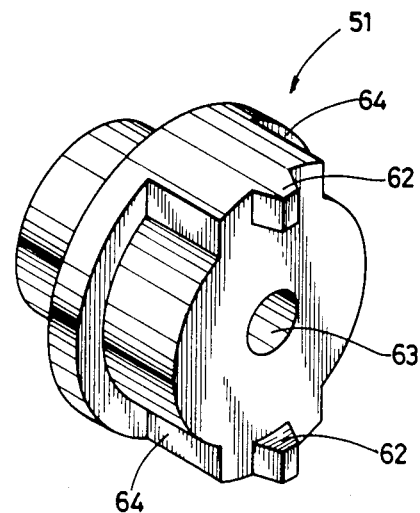
FIG. 18 is a perspective view of a brake member shown in FIG. 10.
Figure 19:
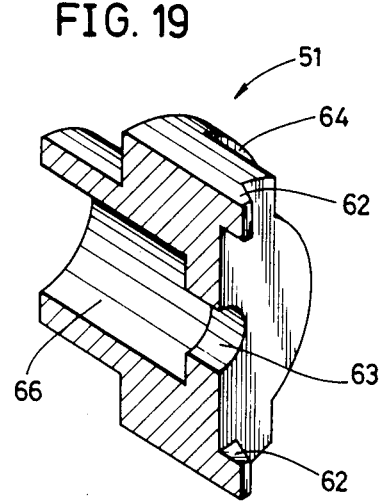
FIG. 19 is a central sectional view of the brake member shown in FIG. 18.

The brake member 51 shown in FIGS. 18 and 19 has on its lateral surface opposed to the lower end fixing bracket 52, two engagement projections 62 engageable with the engagement recesses 61. Each engagement projection is tapered so that is width is gradually narrowed toward the top. Further, the brake member 51 has a central throughgoing hole 63, through which the connecting pin 54 extends.

With attention paid to the shape of the brake member 51, it is seen that the brake member 51 is substantially cylindrical, having two arcuate notches 64 on its outer peripheral surface. The left-hand lateral surface 11 of the bottom of the seat portion shown in FIG. 10 has a reception hole 65 for slidably receiving the brake member 51. The reception hole 65 is shaped to correspond to the portion of the brake member 51 where said two arcuate notches 64 are formed, and is adapted to slidably support such portions. Thus, as long as a turning force below a predetermined value is applied to the brake member 51, it is not possible for the brake member 51 to rotate relative to the left-hand lateral surface 11 of the bottom of the seat portion. However, such rotation is possible in response to a turning force larger than said predetermined value, as will now be described.

Referring to FIG. 19, the brake member 51 has a storage opening 66 extending from the lateral surface positioned within the seat portion 2 to the lateral surface opposed to the lower end fixing bracket 52. A spring 67 is stored in the storage opening 66, as shown in FIG. 10. One end of the spring 67 abuts against the bottom of the storage opening 66 and the other end against the head 68 formed on one end of the connecting pin 54. Thus, the brake member 51 is constantly urged by the spring 67 to slide in one direction, or to the right as viewed in FIG. 10. This direction is also the one which causes the engagement between the engagement projection 62 on the brake member 51 and the engagement recesses 61 of the lower end fixing bracket 52.

Thus, the spring 67 will cause the brake member 51 to exert a braking force against the turning movement of the left-hand support rod 9 as long as the force of the turning movement is smaller than the force of the spring 67. That is, by positioning the engagement projections 62 in the engagement recesses 61, there is exerted a force which prevents the turing movement of the left-hand support rod 9 to the extent of the force of the spring 67. This preventing force is the greater, the strong the spring 67. When a turning force above a predetermined value is applied to the left-hand support rod 9 as the safety guard 6 is caused to slide due to, for example, a collision accident, the brake member 51 will slide against the force of the spring 67, whereby the between the engagement projections 62 and the recesses 61 is canceled, thus allowing the left-hand support rod 9 to rotate to the extent permitted by the spring 17 and the hole 32, whereby an impact force is cushioned by the spring 17 as long as the connecting members 15, 16 are still engaged in the holes 27, as will normally be the case when the seat 1 is in use. On the other hand, when the members 15, 16 are pulled out of the holes 27, the operator can bring the guard 6 into the position shown in FIG. 2 by applying a force exceeding the force of the spring 67.

In addition, the engagement projections 62 and engagement recesses 61 are so shaped as to achieve said sliding movement. As an example, the engagement projections 62 and engagement recesses 61 are tapered, as described above.

The aforesaid arrangement which applies a braking force against the turning movement of the left-hand support rod 9 provides the following advantage. In the absence of the arrangement just described above, the left-hand spring 17 shown in FIG. 8 and the respective right-hand spring would have to individually support the entire impact. Thus, considerably stronger springs would be required which do not provide a desired cushioning. If, however, the arrangement is such that a braking force is applied against the turning movement of the left-hand support rod 9, the entire impact force will be absorbed at two locations and the range of selection of springs will be widened.

Figure 20:
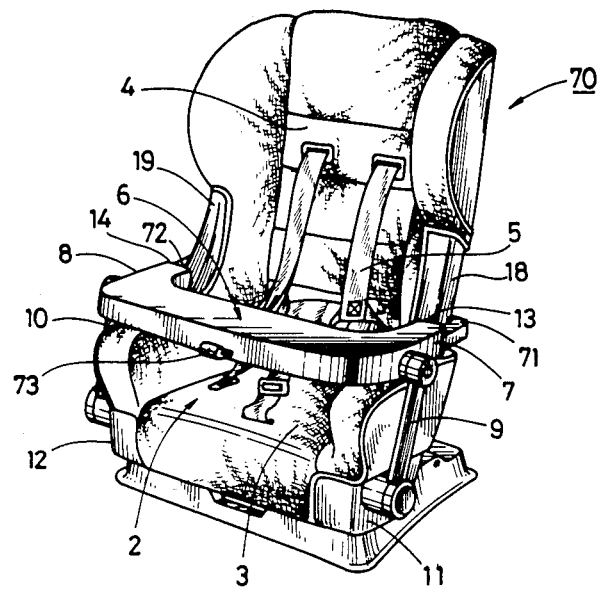
FIG. 20 is a perspective view showing another embodiment of this invention.

FIG. 20 is a perspective view of another embodiment of this invention. The difference between the illustrated children's automobile-mounted safety seat 70 and the children's automobile-mounted safety seat of FIG. 1 is in the arrangement associated with the right-hand and left-hand connecting members. The left-hand and right-hand connecting members 71 and 72 of the seat 70 are turnably built into the safety guard 6. Further, as shown, an operating button 73 for rotatively operating the left-hand right-hand connecting members 71 and 72 projects from the front surface of the safety guard 6.

FIG. 21 shows the safety guard 6 with its upper half removed. The left-hand connecting member 71 is built into the safety guard 6 in such a manner that it is turnable around a pin 74 to be described below. The rear portion of the left-hand connecting member 71 projects through the rear surface of the safety guard 6 and has a right-hand projection 75 extending to the right. Correspondingly thereto, the left-hand rear portion 18 of the seat has a left-hand reception recess 76 engageable with the right-hand projection 75. When the right-hand projection 75 on the left-hand connecting member 71 and the unillustrated left-hand projection on the right-hand connecting member 72 are respectively in engagement with the left-hand reception recess 76 and the right-hand reception recess in the left-hand and right-hand rear portions 18 and 19 of the seat, the safety guard 6 is in its state attached to the seat portion 2, as shown in FIG. 20. On the other hand, when the engagement between the right-hand projection 75 and the left-hand projection and the engagement between the left-hand reception recess 76 and the right-hand reception recess are canceled, the safety guard 6 can be tilted forwardly of the seat portion 2.

The described engagement and disengagement between the left-hand and right-hand connecting rods 71 and 72 and the left-hand and right-hand rear portions 18 and 19 of the seat are effected by rotating the left-hand and right-hand connecting members 71 and 72 through the return springs 77 of which only the left-hand return spring is shown, and by the rotatable operating means 78. The return spring 77 urges the left-hand connecting member 71 to turn in the direction which causes it to engage the left-hand rear portion 18 of the seat thereby urging the left-hand connecting member 71 to turn counterclockwise as viewed in the flange. The rotatable operating means 78 include four plates three of which are shown as at 79, 80, and 81, an operating button 73, and a pair of guide members 82. The plate 79 is turnably connected at its left-hand end to the front end of the left-hand connecting member 71 and at its right-hand end to the left-hand end of the plate 80. The left-hand end of the plate 81 extending from the right-hand connecting member 72 through one plate, and the right-hand end of the plate 80 are turnably connected to the operating button 73 by a pin 83. The front portion of the operating button 73 projects forwardly of the front surface of the safety guard 6. The guide members 82 forming a pair are positioned on both sides of the operating button 73 to guide the longitudinal movement of the operating button 73. Further, each of the guide members 82 has an inclined surface 82a at its rear end. Preferably, to smooth the sliding movement of the operating button 73, rolling elements are disposed between the operating button 73 and the safety guard 6. In this embodiment, rollers 84 are used as rolling elements. Alternately, balls may be used as rolling elements.

When it is desired to remove the safety guard 6 from the seat portion 2, the operating button 73 is pulled forwardly. With the forward movement of the operating button 73, the plates 80 and 81 come into surface contact with the inclined surfaces 82a of the guide members 82, as shown in FIG. 22, whereby the plate 80 is turned counterclockwise and the plate 81 clockwise as viewed in the figure. Therefore, the plate 79 is pulled to the right by the plate 80, with the result that the left-hand connecting member 71 is turned against the force of the return spring 77, thereby canceling the engagement between the right-hand projection 75 and the left-hand reception recess 76 of the seat portion 2. Likewise, the engagement between the right-hand connecting member 72 and the right-hand rear portion 19 of the seat portion 2 is canceled. In this manner, by pulling the operating button 73 projecting forwardly of the front surface of the safety guard 6, the safety guard 6 can be easily removed from the seat portion 2.

In addition, it is desirable to form an elongated hole 79a in the region of connection between the plates 79 and 80 and the region of connection between the unillustrated remaining plates for assuring a smooth plate movement.

Figure 23:
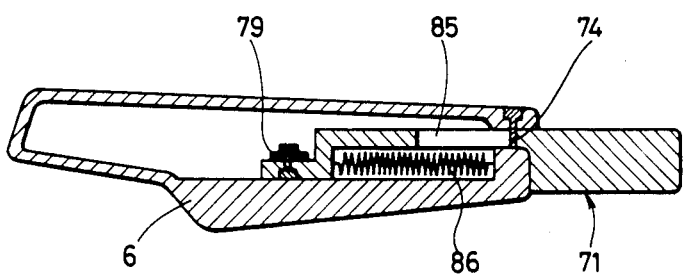
FIG. 23 is a sectional view showing a portion associated with a left-hand connecting member.

Referring to FIG. 23, the left-hand connecting member 71 has a longitudinally extending elongated hole 85. The safety guard 6 has a pin 74 to be positioned in said elongated hole 85. Thus, the left-hand connecting member 71 and the safety guard 6 are relatively slidable within the same range as the pin 74 is movable in the elongated hole 85. Further, a left-hand spring 86 is disposed between the front portion of the left-hand connecting member 71 and the rear end of the safety guard 6, for urging the safety guard 6 and the left-hand connecting member 71 to slide toward each other, or for urging the safety guard 6 to slide rearwardly.

Figure 24:
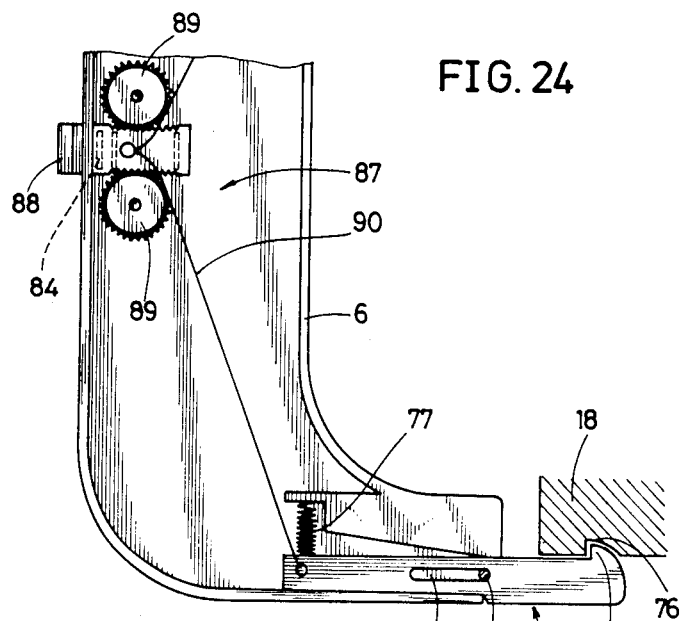
FIG. 24 is a plan view showing another example of rotatable operating means for rotating the left-hand and right-hand connecting members.

FIG. 24 shows another example of the rotatable operating means for rotating the left-hand and right-hand connecting members 71 and 72. The illustrated operating means 87 includes an operating button 88, a pair of gears 89 disposed on both sides of said operating button 88, and a string 90. The operating button 88 projects forwardly of the front surface of the safety guard 6 and has teeth on both sides. The gears 89 have teeth for meshing with the teeth of the operating button 88. The string 90 interconnects the left-hand connecting member 71, the operating button 88 and the right-hand connecting member 72. Further, as in the case of the described rotatable operating means, disposed between the operating button 88 and the safety guard 6, are rollers 84 for smoothing the sliding movement of the operating button 88. If the operating button 88 is pulled forwardly from the state shown in FIG. 24, the middle portion of the string 90 is moved forwardly, with the result that the left-hand and right-hand connecting members 71 and 72 are turned against the forces of the return springs 77.

Figure 25:
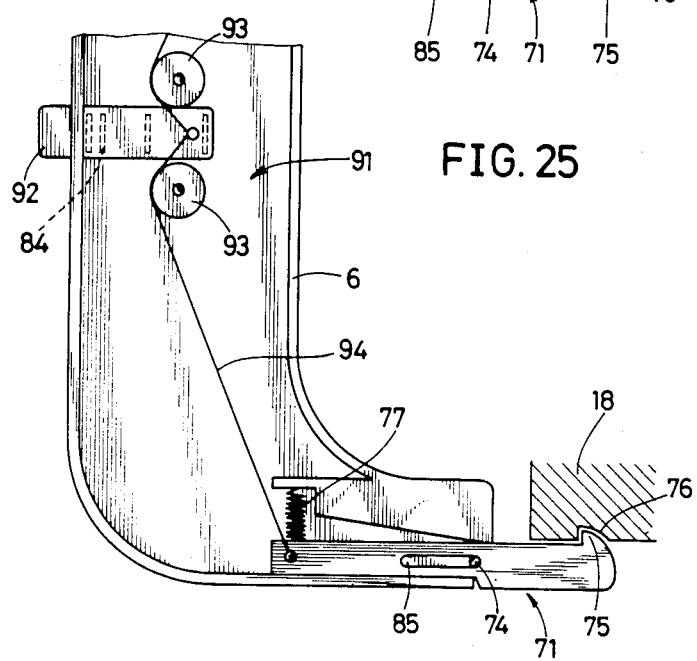
FIG. 25 is a plan view showing a further example of rotatable operating means.

Still another example of a rotatable operating means 91 is shown in FIG. 25 including an operating button 92 projecting forwardly of the front surface of the safety guard 6, a pair of pulleys 93 disposed to abut against both sides of said operating button 92, and a string 94. The string 94 interconnects the left-hand connecting members 71, the operating button 92 and the right-hand connecting member 72. Unlike the case of the operating means 87 shown in FIG. 24, the string 94 of FIG. 25 extends around the front portions of the pulleys 93. Thus, if the operating button 92 is pushed in rearwardly from the state shown in FIG. 25, the middle portion of the string 94 is moved rearwardly, whereby the left-hand and right-hand connecting members 71 and 72 are turned against the forces of the return springs 77.

Figure 26:
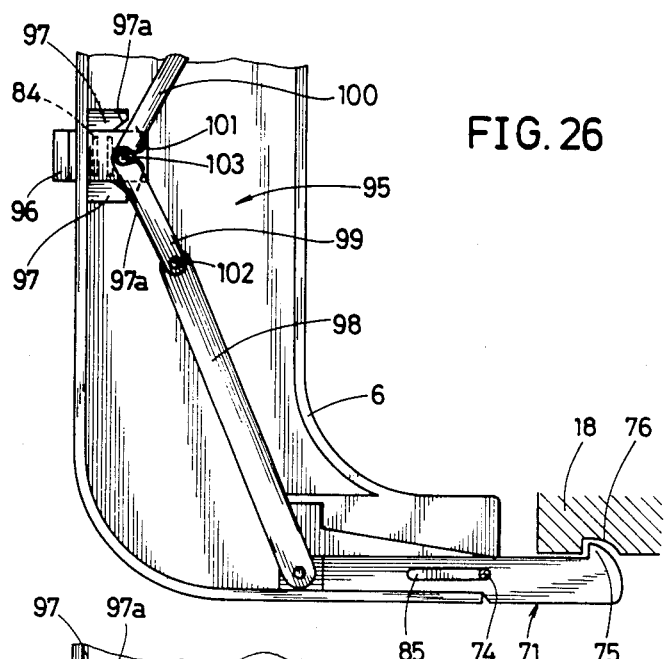
FIG. 26 is a plan view showing still another example of rotatable operating means.
Figure 27:
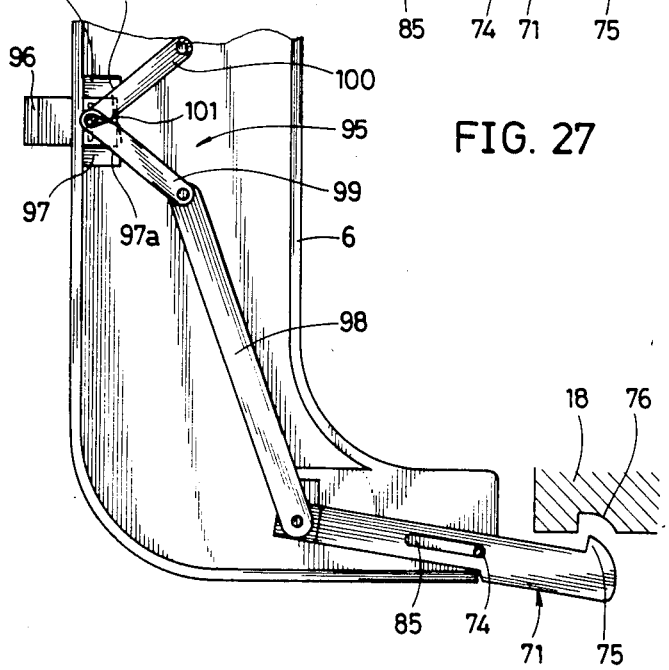
FIG. 27 is a view showing a state after an operating button has been forwardly pulled from the state of FIG. 26.

FIG. 26 shows another example of a rotatable operating means 95 including an operating button 96 projecting forwardly of the front surface of the safety guard 6, a pair of guide members 97 positioned on both sides of the operating button 96 to guide the longitudinal slide movement of the operating button 96, four plates three of which are shown as at 98, 99, and 100, and a torsion spring 101. The plates 98 and 99 are interconnected by a pin 102 for relative rotation. The left-hand end of the plate 98 is rotatably connected to the front end of the left-hand connecting member 71. The plates 99 and 100 are rotatably connected to the operating button 96 by a pin 103. The torsion spring 101 is disposed around the pin 103. The torsion spring 101 urges the plates 99 and 100 to open, or urges the plate 99 to turn clockwise and the plate 100 counterclockwise as viewed in the figure. Further, each of the guide members 97 has an inclined surface 97a at the rear end thereof. In the state shown in FIG. 26, the right-hand projection formed on the left-hand connecting member 71 engages the reception recess 76 formed in the left-hand rear portion 18 of the seat portion 2, while the right-hand connecting member 72 engages the right-hand rear portion 19 of the seat portion 2. If the operating button 96 is pulled forwardly from this state, the plates 99 and 100 are turned toward each other against the force of the torsion spring 101 while being guided by the guide members 97. Finally, the state shown in FIG. 27 is established. In this state, the plate 98 has been moved to the right and, correspondingly thereto, the left-hand connecting member 71 has been turned upwardly in the predetermined direction. As a result, the right-hand projection 75 on the left-hand connecting member 71 is disengaged from the left-hand reception recess 76 formed in the left-hand rear portion 18 of the seat portion 2. Likewise, the right-hand connecting member 72 is disengaged from the right-hand rear portion 19 of the seat portion 2. In the embodiment shown in FIGS. 26 and 27, a torsion spring 101 has been used as a return spring for urging the left-hand and right-hand connecting members into engagement with the left-hand and right-hand rear portions of the seat portion, respectively. Unlike the embodiments described above, the torsion spring 101 is disposed so that it can directly actuate the rotative operating means. On the other hand, in the embodiments described above, the return springs are disposed to abut against the left-hand and right-hand connecting members 71 and 72.

Figure 28:
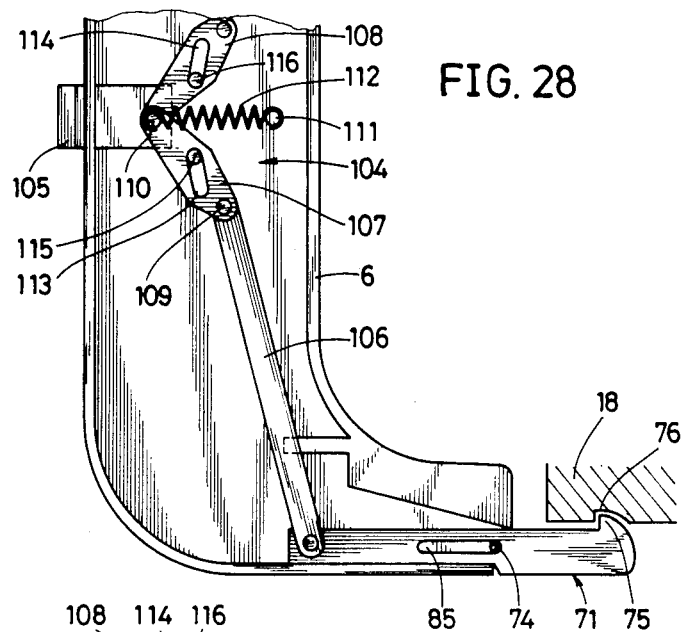
FIG. 28 is a plan view showing yet another example of rotatable operating means.
Figure 29:
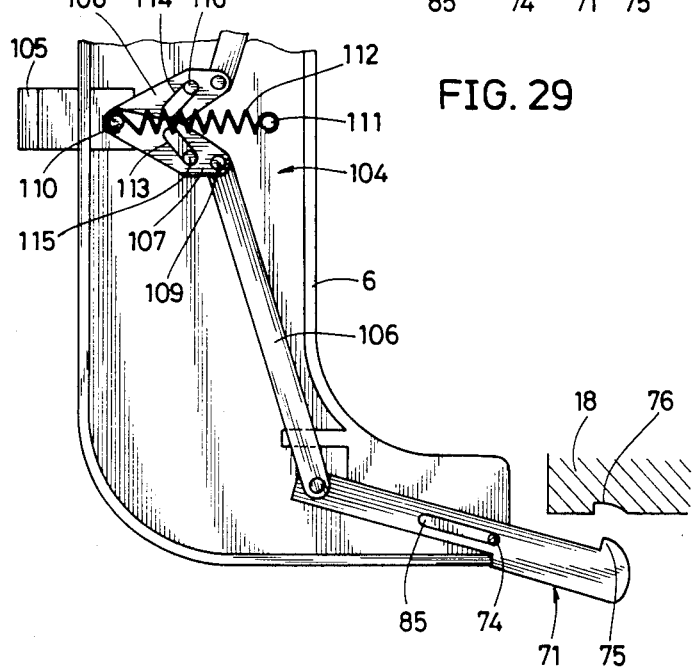
FIG. 29 is a view showing a state after an operating button has been forwardly pulled from the state of FIG. 22.

Yet another example of rotatable operating means 104 is shown in FIGS. 28 and 29, including an operating button 105 projecting forwardly of the front surface of the safety guard 6, and four plates, three of which are shown as at 106, 107, and 108. The plates 106 and 107 are interconnected by a pin 109 for relative rotation. The left-hand end of the plate 106 is rotatably connected to the front end of the left-hand connecting member 71. The plates 107 and 108 are rotatably connected to the operating button 105 by a pin 110. A return spring 112 connecting a pin 110 on the operating button and a pin 111 fixed on the safety guard 6 constantly urges the operating button 105 to move rearwardly. Further, as shown, the plates 107 and 108 connected to the operating button 105, have elongated holes 113 and 114 extending in predetermined directions, respectively. Pins 115 and 116 fixed to the safety guard 6, are positioned in the elongated holes 113 and 114, respectively.

In the state shown in FIG. 28, the right-hand projection 75 on the left-hand connecting member 71 engages the left-hand reception recess 76 in the left-hand rear portion 18 of the seat portion 2, while the right-hand connecting member 72 engages the right-hand rear portion 19 of the seat portion 2. If the operating button 105 is pulled forwardly from this state, the plates 107 and 108 are turned toward each other while being guided by the pins 115 and 116 positioned in the elongated holes 113 and 114. Finally, the state shown in FIG. 29 is established. In this state, the plate 106 has been moved to the right and, correspondingly thereto, the left-hand connecting member 71 has been also turned upwardly in the predetermined direction. As a result, the right-hand projection 75 on the left-hand connecting member 71 is disengaged from the left-hand reception recess 76 in the left-hand rear portion 18 of the seat portion 2. Likewise, the right-hand connecting member 72 is disengaged from the right-hand rear portion 19 of the seat portion 2.

In the embodiments shown in FIGS. 20 to 29, the left-hand and right-hand connecting members 71 and 72 have right-hand projection 75 and left-hand projection, respectively, and the left-hand and right-hand rear portions 18 and 19 of the seat portion 2 have left-hand reception recess 76 and a respective right-hand reception recess for engagement therewith. However, a reverse arrangement is possible, that is, the left-hand and right-hand connecting members 71 and 72 may have recesses while providing the left-hand and right-hand rear portions 18 and 19 of the seat portion 2 with projections engageable with said recesses.

Although the present invention has been described and illustrated in detail, it is clearly understood that the same is by way of illustration and example only and is not to be taken by way of limitation, the scope of the present invention being limited only by the terms of the appended claims.

What is claimed is:

1. A children's automobile-mounted safety seat comprising a seat portion for seating a baby or child therein, said seat portion having first lateral surfaces, a safety guard disposed forwardly of said seat portion, said safety guard having second lateral surfaces, left-hand and right-hand support rods having respective upper and lower support rod ends, first journal means for rotatably connecting said lower support rod ends to the respective one of said first lateral surfaces of said seat portion, and second journal means for rotatably connecting said upper support rod ends to the respective one of said second lateral surfaces of said safety guard, left-hand and right-hand connecting members for removably securing said safety guard to said safety seat, mounting means for movably attaching said connecting members to said safety guard for permitting a relative longitudinal sliding movement within a predetermined range between said connecting members and said safety guard, left-hand and right-hand springs interposed between said mounting means and said safety guard for urging said mounting means and thus said left-hand and right-hand connecting members and said safety guard to move toward each other, said second journal means comprising a journal axis and journalling movement limiting members operatively interposed between said upper support rod ends and said second journal means for limiting a journalling movement of said support rods about said journal axis to said predetermined range of said sliding movement.

2. The children's automobile-mounted safety seat of claim 1, wherein each of said mounting means for said left-hand and right-hand connecting members comprises a longitudinally extending elongated hole, wherein said safety guard comprises pins each positioned in its respective hole of said elongated holes, whereby said left-hand and right-hand connecting members and said safety guard are slidable relative to each other within the same range as said pins are movable in said elongated holes.

3. The children's automobile-mounted safety seat of claim 1, wherein said journalling movement limiting members of said second journal means comprise arcuate elongated holes in said second lateral surfaces of said safety guard, said arcuate holes having an arc center located in said journal axis, said journalling movement limiting members further comprising on said upper ends of said left-hand and right-hand support rods projections positioned in said arcuate elongated holes, whereby said left-hand and right-hand support rods are turnable about said journal axis relative to said safety guard within the same range as said projections are movable in said arcuate elongated holes.

4. The children's automobile-mounted safety seat of claim 1, wherein said first journal means comprise a further journal axis and brake means including a plurality of brake engagement recesses at said lower support rod ends of said left-hand and right-hand support rods, said plurality of engagement recesses being located along a circle having a center located in said further journal axis, said brake means further including at said first lateral surfaces of said seat portion brake members longitudinally slidable relative to said further journal axis, said brake members having engagement projections engageable with said brake engagement recesses, further spring means located for urging each of said brake members to slide on said further journal axis in the direction which causes said engagement projections to engage said engagement recesses, and wherein said engagement projections and said engagement recesses are so shaped that when a turning force above a predetermined value is imparted to each of said left-hand and right-hand support rods, each of said brake members is caused to slide against the force of said further spring means, thereby canceling the engagement between said engagement projections and said engagement recesses.

5. The children's automobile-mounted safety seat of claim 1, wherein said mounting means for said left-hand and right-hand connecting members comprise pivot members for turnably mounting said connecting members in said safety guard, said left-hand and right-hand connecting members having rear ends adapted to engage a respective left-hand and right-hand rear portion of said seat, means for disengaging said rear ends of said connecting members by pivoting of said connecting members in a predetermined direction, said seat further comprising return springs arranged for urging said left-hand and right-hand connecting members to turn in a direction opposite to said predetermined direction for engaging said connecting members with said left-hand and right-hand rear portion of said seat, and wherein said means for disengaging comprise operating means connected to said left-hand and right-hand connecting members for pivoting said left-hand and right-hand connecting members against the forces of said return springs for causing said disengaging.

6. The children's automobile-mounted safety seat of claim 5, wherein said operating means include an operating button projecting forwardly of a front surface of said safety guard, the arrangement being such that if said operating button is operated, the engagement between said left-hand and right-hand connecting members and the left-hand and right-hand rear portions of said seat, respectively, is canceled.

7. The children's automobile-mounted safety seat of claim 6, wherein said operating means include rolling elements disposed for supporting said operating button for preventing jamming of said operating button.

8. The children's automobile-mounted safety seat of claim 7, wherein said rolling elements are rollers for guiding said operating button.

9. The children's automobile-mounted safety seat of claim 5, wherein said operating means include a link mechanism comprising a plurality of pivotally interconnected plates for linking said connecting members to said disengaging means.

10. The children's automobile-mounted safety seat of claim 6, wherein said operating means include string means which interconnect said left-hand connecting member, said operating button and said right-hand connecting member so that operation of said operating button transmits an operating force through said string means to both of said connecting members.

11. The children's automobile-mounted safety seat of claim 5, wherein said return springs are disposed to abut against said left-hand and right-hand connecting members.

12. The children's automobile-mounted safety seat of claim 5, wherein said return spring is arranged for directly actuating said operating means thereby exerting a force on said connecting members.

13. The children's automobile-mounted safety seat of claim 5, wherein rear ends of said left-hand and right-hand connecting members comprise right-hand and left-hand projections projecting to the right and left, respectively, and wherein the left-hand and right-hand rear portions of said seat comprise left-hand and right-hand reception recesses for engagement with said right-hand and left-hand projections, respectively.

14. A children's automobile-mounted safety seat, comprising a seat portion for seating a baby or child therein, said seat portion having first lateral surfaces, a safety guard disposed forwardly of said seat portion, said safety guard having second lateral surfaces, left-hand and right-hand support rods having respective upper and lower support rod ends, first journal means for rotatably connecting said lower support rod ends to the respective one of said first lateral surfaces of said seat portion, and second journal means for rotatably connecting said upper support rod ends to the respective one of said second lateral surfaces of said safety guard, left-hand and right-hand connecting members for removably securing said safety guard to said safety seat, mounting means for movably attaching said connecting members to said safety guard for permitting a relative longitudinal sliding movement within a predetermined range between said connecting members and said safety guard, left-hand and right-hand springs interposed between said mounting means and said safety guard for urging said mounting means and thus said left-hand and right-hand connecting members and said safety guard to move toward each other, and wherein said first journal means comprise a first journal axis and brake means including a plurality of brake engagement recesses at said lower support rod ends, said plurality of engagement recesses being located along a circle having a center located in said first journal axis, said brake means further including at said first lateral surfaces of said seat portion brake members longitudinally slidable relative to said first journal axis, said brake members having engagement projections engageable with said brake engagement recesses, further spring means located for urging each of said brake members to slide on said first journal axis in the direction which causes said engagement projections to engage said engagement recesses, and wherein said engagement projections and said engagement recesses are so shaped that when a turning force above a predetermined value is imparted to each of said left-hand and right-hand support rods, each of said brake members is caused to slide against the force of said further spring means, thereby canceling the engagement between said engagement projections and said engagement recesses.

15. A children's automobile-mounted safety seat comprising a seat portion for seating a baby or child therein, said seat portion having first lateral surfaces, a safety guard disposed forwardly of said seat portion, said safety guard having second lateral surfaces, left-hand and right-hand support rods having respective upper and lower support rod ends, first journal means for rotatably connecting said lower support rod ends to the respective one of said first lateral surfaces of said seat portion, and second journal means for rotatably connecting said upper support rod ends to the respective one of said second lateral surfaces of said safety guard, left-hand and right-hand connecting members for removably securing said safety guard to said safety seat, mounting means for movably attaching said connecting members to said safety guard for permitting a relative longitudinal sliding movement within a predetermined range between said connecting members and said safety guard, left-hand and right-hand springs interposed between said mounting means and said safety guard for urging said mounting means and thus said left-hand and right-hand connecting members and said safety guard to move toward each other, wherein said first journal means comprise a first journal axis and brake means including a plurality of brake engagement recesses at said lower support rod ends, said plurality of engagement recesses being located along a circle having a center located in said first journal axis, said brake means further including at said first lateral surfaces of said seat portion brake members longitudinally slidable relative to said first journal axis, said brake members having engagement projections engageable with said brake engagement recesses, further spring means located for urging each of said brake members to slide on said first journal axis in the direction which causes said engagement projections to engage said engagement recesses, wherein said engagement projections and said engagement recesses are so shaped that when a turning force above a predetermined value is imparted to each of said left-hand and right-hand support rods, each of said brake members is caused to slide against the force of said further spring means, thereby canceling the engagement between said engagement projections and said engagement recesses, and wherein said second journal means comprise journalling movement limiting members including arcuate elongated holes in said second lateral surfaces of said safety guard, said arcuate holes having an arc center located in a second journal axis of said second journalling means, said journalling movement limiting members further comprising on said upper ends of said left-hand and right-hand support rods projections positioned in said arcuate elongated holes, whereby said left-hand and right-hand support rods are turnable about said second journal axis relative to said safety guard within the same range as said projections are movable in said arcuate elongated holes.

* * * * *